United States Patent
Tsai et al.

(10) Patent No.: US 9,160,233 B2
(45) Date of Patent: Oct. 13, 2015

(54) CONTROLLER FOR CONTROLLING A POWER CONVERTER TO OUTPUT CONSTANT POWER AND RELATED METHOD THEREOF

(71) Applicant: Leadtrend Technology Corp., Hsin-Chu (TW)

(72) Inventors: Meng-Jen Tsai, Hsin-Chu (TW); Ming-Chang Tsou, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 175 days.

(21) Appl. No.: 14/045,788

(22) Filed: Oct. 3, 2013

(65) Prior Publication Data

US 2014/0098570 A1    Apr. 10, 2014

Related U.S. Application Data

(60) Provisional application No. 61/709,995, filed on Oct. 5, 2012.

(51) Int. Cl.
*H02M 3/335* (2006.01)
*H02M 3/24* (2006.01)
*H02M 1/00* (2007.01)

(52) U.S. Cl.
CPC ............ *H02M 3/24* (2013.01); *H02M 3/33507* (2013.01); *H02M 2001/0019* (2013.01)

(58) Field of Classification Search
CPC .............. H02M 3/24; H02M 3/33523; H02M 3/33507; H02M 2001/0009; G05F 1/46; G05F 1/462; G05F 1/468; G05F 1/575; G05F 1/66; G05F 5/00

USPC ................ 323/234, 265, 282, 285, 286, 287; 363/15, 21.12, 21.15, 21.17, 21.28; 315/219, 291, 307, 308, 362

See application file for complete search history.

(56) References Cited

U.S. PATENT DOCUMENTS

| | | | |
|---|---|---|---|
| 5,633,787 A * | 5/1997 | Song | 363/21.1 |
| 5,991,181 A * | 11/1999 | Fujii et al. | 363/97 |
| 6,122,180 A * | 9/2000 | Seo et al. | 363/21.17 |
| 6,445,598 B1 * | 9/2002 | Yamada | 363/21.12 |

(Continued)

FOREIGN PATENT DOCUMENTS

| | | |
|---|---|---|
| TW | I288314 | 10/2007 |
| TW | I325672 | 6/2010 |
| TW | I372510 | 9/2012 |

*Primary Examiner* — Adolf Berhane
*Assistant Examiner* — Jye-June Lee
(74) *Attorney, Agent, or Firm* — Winston Hsu; Scott Margo

(57) ABSTRACT

A controller for controlling a power converter to output constant power includes a current sensing module, a voltage generation module, and a voltage regulation module. The current sensing module generates a sensing current according to an output current flowing through a secondary side of the power converter. The voltage generation module generates a set voltage corresponding to a reciprocal of the sensing current according to the sensing current. The voltage regulation module generates a regulation voltage to a feedback circuit of the secondary side of the power converter according to the set voltage and a sensing voltage corresponding to an output voltage of the secondary side of the power converter. The feedback circuit and a primary side of the power converter regulate the output voltage according to the regulation voltage, where a product of the output voltage and the output current is a constant value.

14 Claims, 3 Drawing Sheets

(56) References Cited

U.S. PATENT DOCUMENTS

| | | | |
|---|---|---|---|
| 6,721,192 B1 * | 4/2004 | Yang et al. ................ 363/21.18 |
| 7,035,121 B2 | 4/2006 | Umetsu |
| 7,088,598 B2 | 8/2006 | Yang et al. |
| 2010/0277139 A1 * | 11/2010 | Huang et al. ................ 323/234 |

* cited by examiner

CONTROLLER FOR CONTROLLING A POWER CONVERTER TO OUTPUT CONSTANT POWER AND RELATED METHOD THEREOF

CROSS REFERENCE TO RELATED APPLICATIONS

This application claims the benefit of U.S. Provisional Application No. 61/709,995, filed on Oct. 5, 2012 and entitled "Constant power for overload compensation," the contents of which are incorporated herein by reference.

BACKGROUND OF THE INVENTION

1. Field of the Invention

The present invention relates to a controller for controlling a power converter to output constant power and a related method thereof, and particularly to a controller and a related method thereof that can control a power converter to output constant power through a secondary side of the power converter.

2. Description of the Prior Art

In the prior art, when a secondary side of a power converter is overload, an output current of the secondary side of the power converter can be increased to respond to overload of the secondary side of the power converter. Meanwhile, because the output current of the secondary side of the power converter is increased, a feedback current generated by a feedback circuit (e.g. a photo coupler) of the secondary side of the power converter is decreased, resulting in a power switch controller of a primary side of the power convertor increasing a duty cycle of a power switch of the primary side of the power convertor. Meanwhile, although the power switch controller of the primary side of the power convertor has entered a deep continuous current mode (CCM), because the duty cycle of the power switch of the primary side of the power convertor can not be increased infinitely in an overcurrent protection mode, the secondary side of the power converter cannot maintain a fixed output voltage, resulting in output power of the secondary side of the power converter being gradually decreased. In addition, the prior art can simultaneously control the output current and the output voltage of the secondary side of the power converter through a primary-side regulation constant current/constant voltage technology. However, in the primary-side regulation constant current/constant voltage technology, if the output current of the secondary side of the power converter exceeds a fixed current value, the output current of the secondary side of the power converter is still limited to the fixed current value, resulting in the output power of the secondary side of the power converter being still not maintained at a constant value. Therefore, when the secondary side of the power converter is overload, the output power of the secondary side of the power converter can not be maintained at a constant value, so a next stage circuit coupled to the secondary side of the power converter may not operate normally.

SUMMARY OF THE INVENTION

In view of the above mentioned problems of the prior art, the present invention provides a controller for controlling a power converter to output constant power and a related method thereof to control the power converter to output constant power.

An embodiment provides a controller for controlling a power converter to output constant power. The controller includes a current sensing module, a voltage generation module, and a voltage regulation module. The current sensing module is coupled to a secondary side of the power converter for generating a sensing current according to an output current flowing through the secondary side of the power converter. The voltage generation module is coupled to the current sensing module for generating a set voltage corresponding to a reciprocal of the sensing current according to the sensing current. The voltage regulation module is coupled to the voltage generation module and the secondary side of the power converter for generating a regulation voltage to a feedback circuit of the secondary side of the power converter according to the set voltage and a sensing voltage corresponding to an output voltage of the secondary side of the power converter, wherein the feedback circuit and a primary side of the power converter regulate the output voltage according to the regulation voltage. A product of the output voltage and the output current is a constant value.

Another embodiment provides a method for controlling a power converter to output constant power. The method provides generating a sensing current according to an output current flowing through a secondary side of the power converter; generating a set voltage corresponding to a reciprocal of the sensing current according to the sensing current; generating a regulation voltage to a feedback circuit of the secondary side of the power converter according to the set voltage and a sensing voltage corresponding to an output voltage of the secondary side of the power converter; and regulating the output voltage according to the regulation voltage. A product of the output voltage and the output current is a constant value.

The present invention provides a controller for controlling a power converter to output constant power and a related method thereof. The controller and the method utilize a current sensing module to generate a sensing current according to an output current flowing through a secondary side of the power converter, utilize a voltage generation module to generate a set voltage corresponding to a reciprocal of the sensing current according to the sensing current, and utilize a voltage regulation module to generate a regulation voltage to a feedback circuit of the secondary side of the power converter according to the set voltage and a sensing voltage corresponding to an output voltage of the secondary side of the power converter. Then, the feedback circuit and a primary side of the power converter can regulate the output voltage of the secondary side of the power converter according to the regulation voltage. Thus, the controller provided by the present invention and the feedback circuit of the secondary side of the power converter can repeat the above mentioned steps until the sensing voltage is equal to the set voltage. When the sensing voltage is equal to the set voltage, a product of the output voltage and the output current of the power converter is a constant value. Therefore, compared to the prior art, when the secondary side of the power converter is overload, the present invention can ensure that the output power of the secondary side of the power converter can be maintained at a constant value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
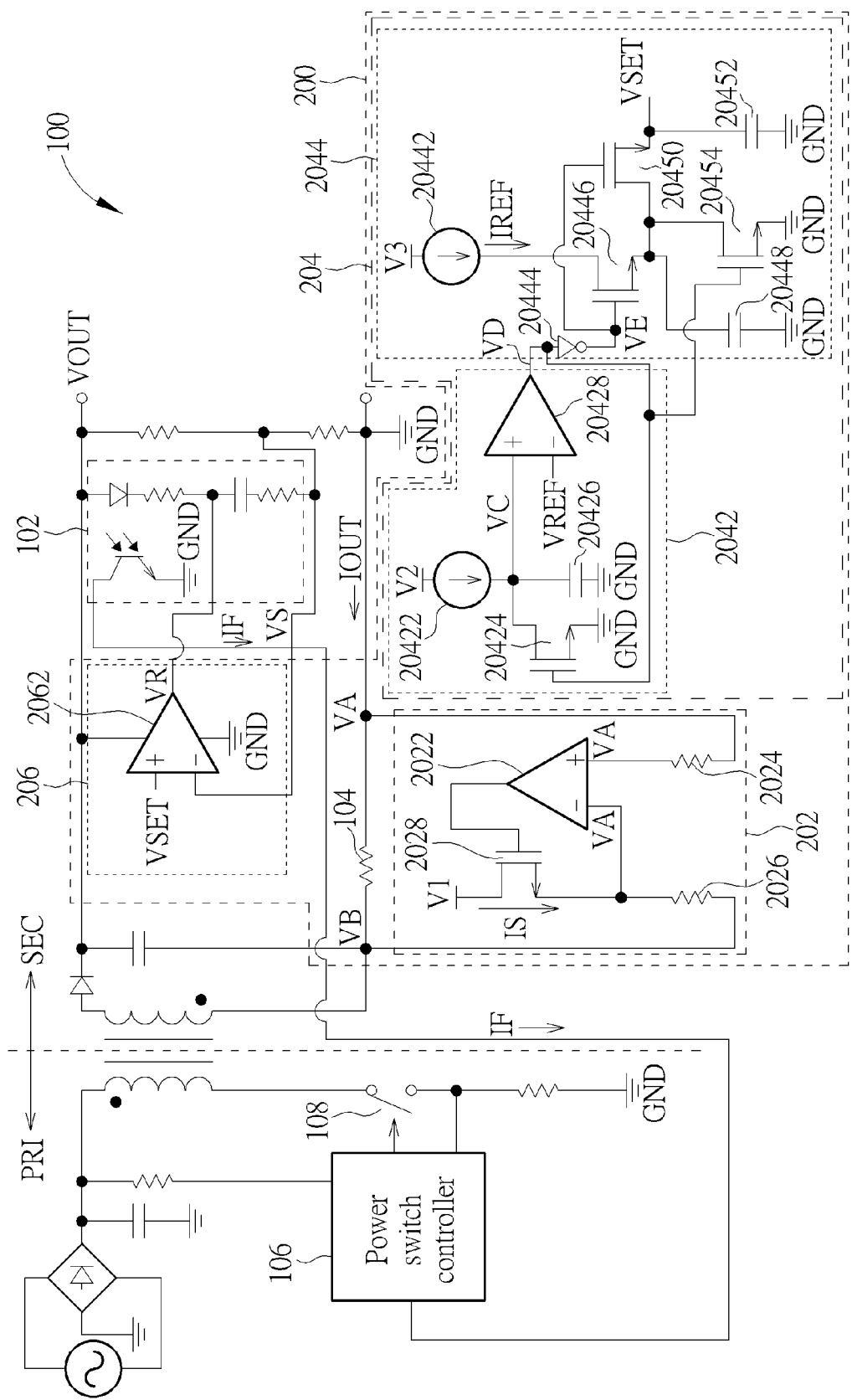
FIG. 1 is a diagram illustrating a controller for controlling a power converter to output constant power according to an embodiment.

Please refer to FIG. 1. FIG. 1 is a diagram illustrating a controller 200 for controlling a power converter 100 to output constant power according to an embodiment. As shown in FIG. 1, the controller 200 includes a current sensing module 202, a voltage generation module 204, and a voltage regulation module 206. The current sensing module 202 generates a sensing current IS according to an output current IOUT flowing through a secondary side SEC of the power converter 100. The voltage generation module 204 generates a set voltage VSET corresponding to a reciprocal of the sensing current IS according to the sensing current IS. The voltage regulation module 206 generates a regulation voltage VR to a feedback circuit 102 (e.g. a photo coupler module) of the secondary side SEC of the power converter 100 according to the set voltage VSET and a sensing voltage VS corresponding to an output voltage VOUT of the secondary side SEC of the power converter 100, wherein the feedback circuit 102 and a primary side PRI of the power converter 100 regulate the output voltage VOUT according to the regulation voltage VR, and a product of the output voltage VOUT and the output current IOUT is a constant value. In addition, the sensing voltage VS is proportional to the output voltage VOUT. For example, the output voltage VOUT is N times to the sensing voltage VS, wherein N is a positive real number.

As shown in FIG. 1, the current sensing module 202 includes an operational amplifier 2022, a first resistor 2024, a second resistor 2026, and a first metal-oxide-semiconductor transistor 2028, wherein the first metal-oxide-semiconductor transistor 2028 is an N-type metal-oxide-semiconductor transistor. But, the present invention is not limited to the first metal-oxide-semiconductor transistor 2028 being an N-type metal-oxide-semiconductor transistor. The first resistor 2024 has a first terminal coupled to a first terminal of a sensing resistor 104 of the secondary side SEC of the power converter 100, and a second terminal coupled to a first input terminal of the operational amplifier 2022, wherein the output current IOUT flowing through the sensing resistor 104. The second resistor 2026 has a first terminal coupled to a second terminal of the sensing resistor 104, and a second terminal coupled to a second input terminal of the operational amplifier 2022. The first metal-oxide-semiconductor transistor 2028 has a first terminal for receiving a first voltage V1, a second terminal coupled to an output terminal of the operational amplifier 2022, and a third terminal coupled to the second input terminal of the operational amplifier 2022.

When the operational amplifier 2022 operates normally, because a voltage of the first input terminal of the operational amplifier 2022 is equal to a voltage of the second input terminal of the operational amplifier 2022, a voltage drop between the first input terminal of the second resistor 2026 and the second input terminal of the second resistor 2026 is equal to VA-VB, wherein the voltage of the first input terminal of the operational amplifier 2022 and the voltage of the second input terminal of the operational amplifier 2022 are equal to VA, and a voltage of the second terminal of the sensing resistor 104 is equal to VB. Therefore, the first metal-oxide-semiconductor transistor 2028 and the second resistor 2026 can generate the sensing current IS according to the voltage drop (VA-VB) between the first input terminal of the second resistor 2026 and the second input terminal of the second resistor 2026 and equation (1):

$$IS = \frac{VA - VB}{R_{2026}} \quad (1)$$

As shown in equation (1), $R_{2026}$ is a resistance of the second resistor 2026. In addition, the output current IOUT can be determined according to equation (2):

$$IOUT = \frac{VA - VB}{R_{104}} \quad (2)$$

As shown in equation (2), $R_{104}$ is a resistance of the sensing resistor 104. As shown in equation (1) and equation (2), a relationship between the sensing current IS and the output current IOUT can be determined according to equation (3):

$$IS = \frac{R_{104}}{R_{2026}} \times IOUT = K \times IOUT \quad (3)$$

As shown in equation (3), K is equal to $$\frac{R_{104}}{R_{2026}},$$

so the sensing current IS is proportional to the output current IOUT (K).

As shown in FIG. 1, the voltage generation module 204 includes a charging time generation unit 2042 and a set voltage generation unit 2044, wherein the charging time generation unit 2042 is used for determining a charging time TC according to the sensing current IS. The set voltage generation unit 2044 is used for generating the set voltage VSET according to the charging time TC. The charging time generation unit 2042 includes a first current source 20422, a second metal-oxide-semiconductor transistor 20424, a first capacitor 20426, and a first comparator 20428. The first current source 20422 has a first terminal for receiving a second voltage V2, and a second terminal, wherein the first current source 20422 is used for mirroring and providing the sensing current IS, and the second voltage V2 can be the same as or different from the first voltage V1. The second metal-oxide-semiconductor transistor 20424 has a first terminal coupled to the second terminal of the first current source 20422, a second terminal, and a third terminal coupled to ground GND, wherein the second metal-oxide-semiconductor transistor 20424 is an N-type metal-oxide-semiconductor transistor. The first capacitor 20426 has a first terminal coupled to the second terminal of the first current source 20422, and a second terminal coupled to the ground GND. The first comparator 20428 has a first input terminal coupled to the second terminal of the first current source 20422, a second input terminal for receiving a reference voltage VREF, and an output terminal coupled to the second terminal of the second metal-oxide-semiconductor transistor 20424, wherein the reference voltage VREF is used for setting output power of the secondary side SEC of the power converter 100.

As shown in FIG. 1, the set voltage generation unit 2044 includes a second current source 20442, an inverter 20444, a third metal-oxide-semiconductor transistor 20446, a second capacitor 20448, a fourth metal-oxide-semiconductor transistor 20450, a third capacitor 20452, and a fifth metal-oxide-semiconductor transistor 20454, wherein the fourth metal-oxide-semiconductor transistor 20450 and the fifth metal-oxide-semiconductor transistor 20454 are N-type metal-oxide-semiconductor transistors. But, the present invention is not limited to the fifth metal-oxide-semiconductor transistor 20454 being an N-type metal-oxide-semiconductor transistor. That is to say, the fifth metal-oxide-semiconductor transistor 20454 can also be a P-type metal-oxide-semiconductor transistor or a transmission gate. The second current source 20442 has a first terminal for receiving a third voltage V3, and a second terminal, wherein the second current source 20442 is used for providing a reference current IREF, and the first voltage V1, the second voltage V2, and the third voltage V3 can be the same or different. The inverter 20444 has a first terminal coupled to the output terminal of the first comparator 20428, and a second terminal. The third metal-oxide-semiconductor transistor 20446 has a first terminal coupled to the second terminal of the second current source 20442, a second terminal coupled to the second terminal of the inverter 20444, and a third terminal. The second capacitor 20448 has a first terminal coupled to the third terminal of the third metal-oxide-semiconductor transistor 20446, and a second terminal coupled to the ground GND. The fourth metal-oxide-semiconductor transistor 20450 has a first terminal coupled to the first terminal of the second capacitor 20448, a second terminal coupled to the second terminal of the inverter 20444, and a third terminal. The third capacitor 20452 has a first terminal coupled to the third terminal of the fourth metal-oxide-semiconductor transistor 20450, and a second terminal coupled to the ground GND for outputting the set voltage VSET. The fifth metal-oxide-semiconductor transistor 20454 has a first terminal coupled to the first terminal of the second capacitor 20448, a second terminal coupled to the first terminal of the inverter 20444, and a third terminal coupled to the ground GND. In addition, when the fifth metal-oxide-semiconductor transistor 20454 is a P-type metal-oxide-semiconductor transistor or a transmission gate, a coupled method corresponding to the fifth metal-oxide-semiconductor transistor 20454 is different from a coupled method corresponding to the fifth metal-oxide-semiconductor transistor 20454 shown in FIG. 1, and will be modified accordingly.

As shown in FIG. 1, the voltage regulation module 206 includes a second comparator 2062. The second comparator 2062 has a first input terminal coupled to the third terminal of the fourth metal-oxide-semiconductor transistor 20450, a second input terminal for receiving the sensing voltage VS, and an output terminal for outputting the regulation voltage VR to the feedback circuit 102, wherein the feedback circuit 102 is used for generating a feedback current IF to a power switch controller 106 of the primary side PRI of the power converter 100 according to the regulation voltage VR.

Figure 2:
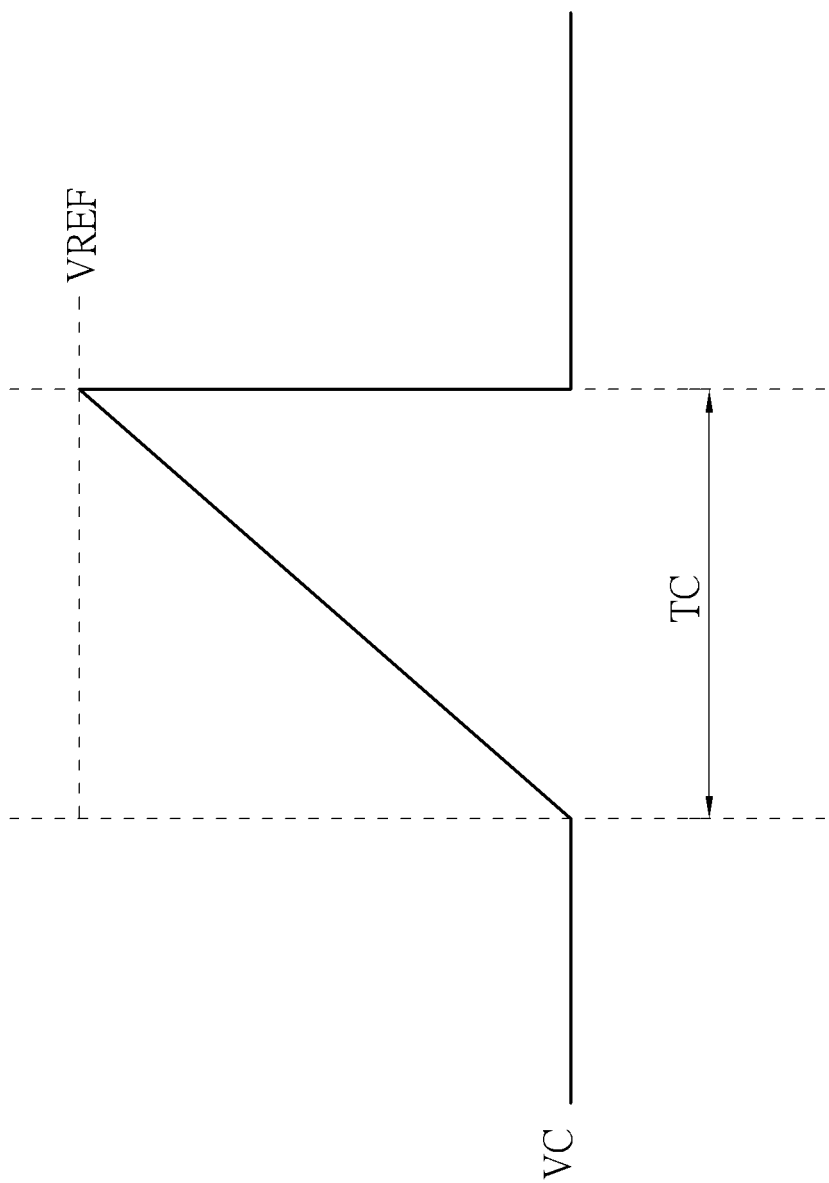
FIG. 2 is a diagram illustrating relationships between the charging time, a voltage of the first terminal of the first capacitor, and the reference voltage.

Please refer to FIG. 2. FIG. 2 is a diagram illustrating relationships between the charging time TC, a voltage VC of the first terminal of the first capacitor 20426, and the reference voltage VREF. As shown in FIG. 1, when the secondary side SEC of the power converter 100 is overload, the output current IOUT of the secondary side SEC of the power converter 100 can be increased to respond to overload of the secondary side SEC of the power converter 100. Meanwhile, because the output current IOUT of the secondary side SEC of the power converter 100 is increased, the sensing current IS generated by the current sensing module 202 according to the output current IOUT is also increased as shown in equation (3).

As shown in FIG. 1 and FIG. 2, when the charging time generation unit 2042 starts to operate, the sensing current IS starts to charge the first capacitor 20426. Because the voltage VC of the first terminal of the first capacitor 20426 is less than the reference voltage VREF, a voltage VD of the output terminal of the first comparator 20428 is low, resulting in the second metal-oxide-semiconductor transistor 20424 being turned off. Therefore, the voltage VC of the first terminal of the first capacitor 20426 is gradually increased until the voltage VC of the first terminal of the first capacitor 20426 is greater than the reference voltage VREF. When the voltage VC of the first terminal of the first capacitor 20426 is greater than the reference voltage VREF, because the voltage VD of the output terminal of the first comparator 20428 is high, the second metal-oxide-semiconductor transistor 20424 is turned on, resulting in the voltage VC of the first terminal of the first capacitor 20426 being decreased. In addition, the second metal-oxide-semiconductor transistor 20424 can be designed to let the voltage VC of the first terminal of the first capacitor 20426 be quickly reduced to zero. Therefore, As shown in FIG. 2, the charging time TC determined by the charging time generation unit 2042 is a charging time of the first capacitor 20426 (that is, the charging time TC is changed with the sensing current IS), wherein the first capacitor 20426, the reference voltage VREF, and the sensing current IS can determine the charging time TC according to equation (4):

$$TC = \frac{C_{20426} \times VREF}{IS} \qquad (4)$$

As shown in equation (4), $C_{20426}$ is a capacitance of the first capacitor 20426.

As shown in FIG. 1 and FIG. 2, during the charging time TC (the voltage VC of the first terminal of the first capacitor 20426 is less than the reference voltage VREF), the voltage VD of the output terminal of the first comparator 20428 is low, so a voltage VE of the second terminal of the inverter 20444 is high. Therefore, during the charging time TC, the fifth metal-oxide-semiconductor transistor 20454 is turned off, the third metal-oxide-semiconductor transistor 20446 is turned on, and the fourth metal-oxide-semiconductor transistor 20450 is turned on. When the fifth metal-oxide-semiconductor transistor 20454 is turned off, the third metal-oxide-semiconductor transistor 20446 is turned on, and the fourth metal-oxide-semiconductor transistor 20450 is turned on, the second current source 20442 charges the second capacitor 20448 and the third capacitor 20452 according to the reference current IREF, wherein the reference current IREF, the second capacitor 20448, the third capacitor 20452, and the charging time TC can determine the set voltage VSET according to equation (4) and equation (5):

$$VSET = \frac{IREF \times C_{20426} \times VREF}{(C_{20448} + C_{20452}) \times IS} \qquad (5)$$

As shown in equation (5), $C_{20448}$ is a capacitance of the second capacitor 20448 and $C_{20452}$ is a capacitance of the third capacitor 20452. As shown in equation (5), the reference voltage VREF, the reference current IREF, the capacitance of the first capacitor 20426, the capacitance of the second capacitor 20448, and the capacitance of the third capacitor 20452 are known, so the set voltage VSET corresponds to a reciprocal of the sensing current IS, that is, the set voltage VSET is inverse proportion to the sensing current IS.

In addition, when the voltage VC of the first terminal of the first capacitor 20426 is greater than the reference voltage VREF, because the voltage VD of the output terminal of the first comparator 20428 is high, the fifth metal-oxide-semiconductor transistor 20454 is turned on, the third metal-oxide-semiconductor transistor 20446 is turned off, and the fourth metal-oxide-semiconductor transistor 20452 is turned off, resulting in a voltage of the first terminal of the second capacitor 20448 being decreased. In addition, the fifth metal-oxide-semiconductor transistor 20454 can be designed to let the voltage of the first terminal of the second capacitor 20448 be quickly reduced to zero.

After the set voltage generation unit 2044 generates the set voltage VSET according to the charging time TC, if the sensing voltage VS is less than the set voltage VSET, the regulation voltage VR generated by the voltage regulation module 206 is high, resulting in the feedback circuit 102 generating the smaller feedback current IF to the power switch controller 106 of the primary side PRI of the power converter 100 according to the regulation voltage VR. Therefore, the power switch controller 106 can regulate a duty cycle of the power switch 108 of the primary side PRI of the power converter 100 to increase the sensing voltage VS (because the sensing voltage VS is proportional to the output voltage VOUT) according to the smaller feedback current IF. If the sensing voltage VS is still less than the set voltage VSET, the controller 200 can repeat the above mentioned steps until the sensing voltage VS is equal to the set voltage VSET.

A product of the set voltage VSET and the sensing current Is is generated by rewriting equation (5):

$$VSET \times IS = \frac{IREF \times C_{20426} \times VREF}{(C_{20448} + C_{20452})} \quad (6)$$

Substituting the output voltage VOUT and the output current IOUT into equation (6) yields equation (7):

$$VOUT \times IOUT = \frac{IREF \times C_{20426} \times VREF}{(C_{20448} + C_{20452})} \times \frac{N}{K} \quad (7)$$

As shown in equation (7), the product of the output voltage VOUT and the output current IOUT is a constant value, so the controller 200 can control the power converter 100 to output constant power.

Figure 3:
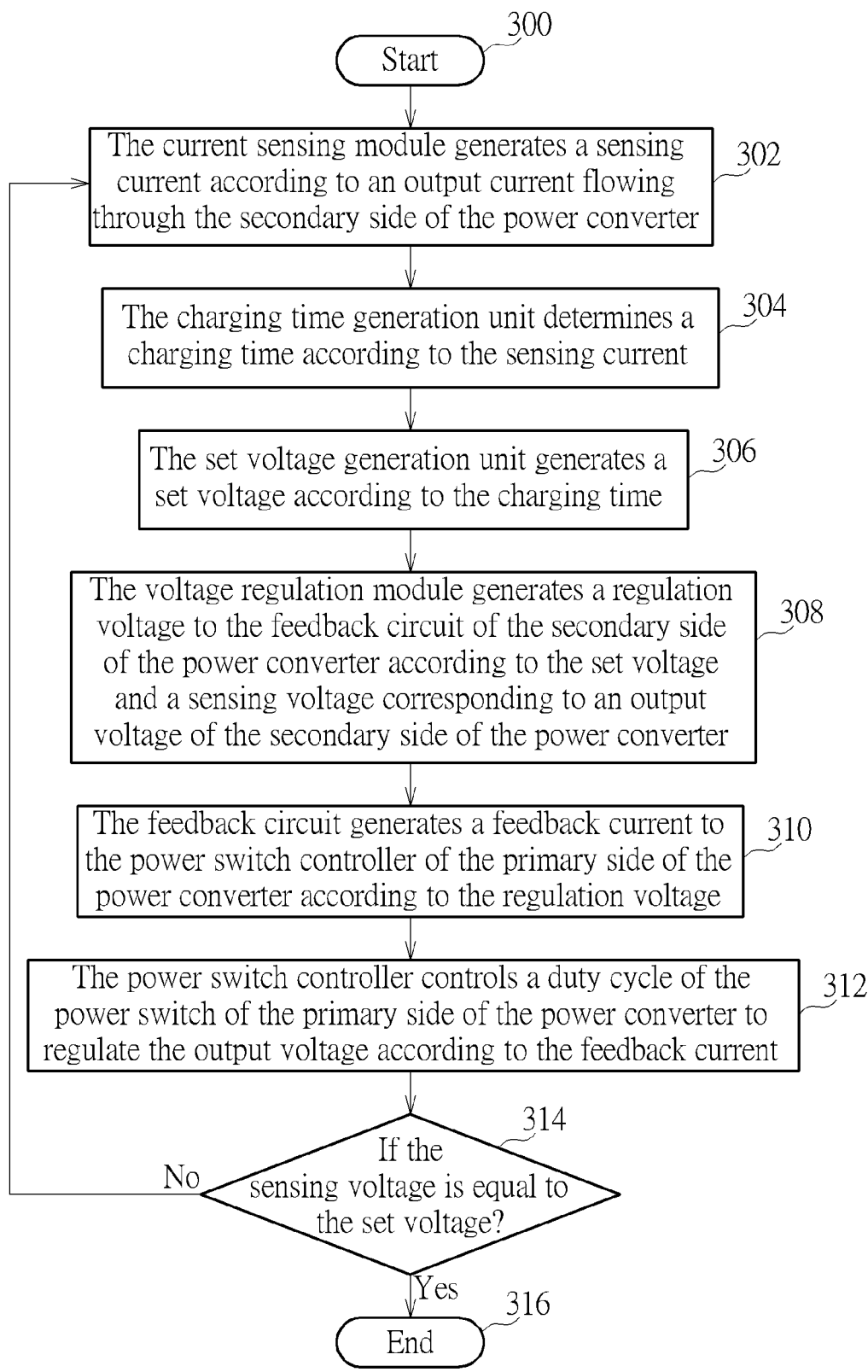
FIG. 3 is a flowchart illustrating a method for controlling a power converter to output constant power according to another embodiment.

Please refer to FIG. 1, FIG. 2, and FIG. 3. FIG. 3 is a flowchart illustrating a method for controlling a power converter to output constant power according to another embodiment. The method in FIG. 3 is illustrated using the controller 200 in FIG. 1. Detailed steps are as follows:

Step 300: Start.

Step 302: The current sensing module 202 generates a sensing current IS according to an output current IOUT flowing through the secondary side SEC of the power converter 100.

Step 304: The charging time generation unit 2042 determines a charging time TC according to the sensing current IS.

Step 306: The set voltage generation unit 2044 generates a set voltage VSET according to the charging time TC.

Step 308: The voltage regulation module 206 generates a regulation voltage VR to the feedback circuit 102 of the secondary side SEC of the power converter 100 according to the set voltage VSET and a sensing voltage VS corresponding to an output voltage VOUT of the secondary side SEC of the power converter 100.

Step 310: The feedback circuit 102 generates a feedback current IF to the power switch controller 106 of the primary side PRI of the power converter 100 according to the regulation voltage VR.

Step 312: The power switch controller 106 controls a duty cycle of the power switch 108 of the primary side PRI of the power converter 100 to regulate the output voltage VOUT according to the feedback current IF.

Step 314: If the sensing voltage VS is equal to the set voltage VSET; if yes, go to Step 316; if no, go to Step 302.

Step 316: End.

In Step 302, as shown in FIG. 1, when the operational amplifier 2022 operates normally, because a voltage of the first input terminal of the operational amplifier 2022 is equal to a voltage of the second input terminal of the operational amplifier 2022, a voltage drop between the first input terminal of the second resistor 2026 and the second input terminal of the second resistor 2026 is equal to VA-VB, wherein the voltage of the first input terminal of the operational amplifier 2022 and the voltage of the second input terminal of the operational amplifier 2022 are equal to VA, and a voltage of the second terminal of the sensing resistor 104 is equal to VB. Therefore, the current sensing module 202 can generate the sensing current IS according to the voltage drop (VA-VB) between the first input terminal of the second resistor 2026 and the second input terminal of the second resistor 2026 and equation (1), wherein the sensing current IS is proportional to the output current IOUT (K) as shown in equation (3).

In Step 304, as shown in FIG. 1 and FIG. 2, when the charging time generation unit 2042 starts to operate, the sensing current IS starts to charge the first capacitor 20426. Because a voltage VC of the first terminal of the first capacitor 20426 is less than the reference voltage VREF, a voltage VD of the output terminal of the first comparator 20428 is low, resulting in the second metal-oxide-semiconductor transistor 20424 being turned off. Therefore, the voltage VC of the first terminal of the first capacitor 20426 is gradually increased until the voltage VC of the first terminal of the first capacitor 20426 is greater than the reference voltage VREF. When the voltage VC of the first terminal of the first capacitor 20426 is greater than the reference voltage VREF, because the voltage VD of the output terminal of the first comparator 20428 is high, the second metal-oxide-semiconductor transistor 20424 is turned on, resulting in the voltage VC of the first terminal of the first capacitor 20426 being decreased. In addition, the second metal-oxide-semiconductor transistor 20424 can be designed to let a discharging current flowing through the second metal-oxide-semiconductor transistor 20424 to the ground GND is much greater than the sensing current IS. Thus, the voltage VC of the first terminal of the first capacitor 20426 can be quickly reduced to zero. Therefore, as shown in FIG. 2, the charging time TC determined by the charging time generation unit 2042 is a charging time of the first capacitor 20426, wherein the first capacitor 20426, the reference voltage VREF, and the sensing current IS can determine the charging time TC according to equation (4).

In Step 306, as shown in FIG. 1 and FIG. 2, during the charging time TC (the voltage VC of the first terminal of the first capacitor 20426 is less than the reference voltage VREF), the voltage VD of the output terminal of the first comparator 20428 is low, so a voltage VE of the second terminal of the inverter 20444 is high. Therefore, during the charging time TC, the fifth metal-oxide-semiconductor transistor 20454 is turned off, the third metal-oxide-semiconductor transistor 20446 is turned on, and the fourth metal-oxide-semiconductor transistor 20450 is turned on. When the fifth metal-oxide-semiconductor transistor 20454 is turned off, the third metaloxide-semiconductor transistor 20446 is turned on, and the fourth metal-oxide-semiconductor transistor 20450 is turned on, the second current source 20442 charges the second capacitor 20448 and the third capacitor 20452 according to a reference current IREF, wherein the reference current IREF, the second capacitor 20448, the third capacitor 20452, and the charging time TC can determine the set voltage VSET according to equation (4) and equation (5). As shown in equation (5), the reference voltage VREF, the reference current IREF, a capacitance of the first capacitor 20426, a capacitance of the second capacitor 20448, and a capacitance of the third capacitor 20452 are known, so the set voltage VSET corresponds to a reciprocal of the sensing current IS, that is, the set voltage VSET is inverse proportion to the sensing current IS.

In addition, when the voltage VC of the first terminal of the first capacitor 20426 is greater than the reference voltage VREF, because the voltage VD of the output terminal of the first comparator 20428 is high, the fifth metal-oxide-semiconductor transistor 20454 is turned on, the third metal-oxide-semiconductor transistor 20446 is turned off, and the fourth metal-oxide-semiconductor transistor 20452 is turned off, resulting in a voltage of the first terminal of the second capacitor 20448 being decreased. In addition, the fifth metal-oxide-semiconductor transistor 20454 can be designed to let the voltage of the first terminal of the second capacitor 20448 be quickly reduced to zero.

In Step 308 and Step 310, after the set voltage generation unit 2044 generates the set voltage VSET according to the charging time TC, if the sensing voltage VS is less than the set voltage VSET, the regulation voltage VR generated by the voltage regulation module 206 is high, resulting in the feedback circuit 102 generating the smaller feedback current IF to the power switch controller 106 of the primary side PRI of the power converter 100 according to the regulation voltage VR.

In Step 312, the power switch controller 106 can regulate the duty cycle of the power switch 108 of the primary side PRI of the power converter 100 to increase the sensing voltage VS (because the sensing voltage VS is proportional to the output voltage VOUT) according to the smaller feedback current IF. If the sensing voltage VS is still less than the set voltage VSET, the controller 200 can repeat the above mentioned steps until the sensing voltage VS is equal to the set voltage VSET. In addition, as shown in equation (7), a product of the output voltage VOUT and the output current LOUT is a constant value, so the controller 200 can control the power converter 100 to output constant power.

To sum up, the controller for controlling the power converter to output constant power and the method for controlling the power converter to output constant power utilize the current sensing module to generate a sensing current according to an output current flowing through the secondary side of the power converter, utilize the voltage generation module to generate a set voltage corresponding to a reciprocal of the sensing current according to the sensing current, and utilize the voltage regulation module to generate a regulation voltage to the feedback circuit of the secondary side of the power converter according to the set voltage and a sensing voltage corresponding to an output voltage of the secondary side of the power converter. Then, the feedback circuit and the primary side of the power converter can regulate the output voltage of the secondary side of the power converter according to the regulation voltage. Thus, the controller provided by the present invention and the feedback circuit of the secondary side of the power converter can repeat the above mentioned steps until the sensing voltage is equal to the set voltage. When the sensing voltage is equal to the set voltage, a product of the output voltage and the output current of the power converter is a constant value. Therefore, compared to the prior art, when the secondary side of the power converter is overload, the present invention can ensure that the output power of the secondary side of the power converter can be maintained at a constant value.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller for controlling a power converter to output constant power, the controller comprising:
   a current sensing module coupled to a secondary side of the power converter for generating a sensing current according to an output current flowing through the secondary side of the power converter;
   a voltage generation module coupled to the current sensing module for generating a set voltage corresponding to a reciprocal of the sensing current according to the sensing current; and
   a voltage regulation module coupled to the voltage generation module and the secondary side of the power converter for generating a regulation voltage to a feedback circuit of the secondary side of the power converter according to the set voltage and a sensing voltage corresponding to an output voltage of the secondary side of the power converter, wherein the feedback circuit and a primary side of the power converter regulate the output voltage according to the regulation voltage;
   wherein a product of the output voltage and the output current is a constant value.

2. The controller of claim 1, wherein the sensing current is proportional to the output current.

3. The controller of claim 1, wherein the current sensing module comprises:
   an operational amplifier;
   a first resistor having a first terminal coupled to a first terminal of a sensing resistor of the secondary side of the power converter, and a second terminal coupled to a first input terminal of the operational amplifier, wherein the output current flows through the sensing resistor;
   a second resistor having a first terminal coupled to a second terminal of the sensing resistor, and a second terminal coupled to a second input terminal of the operational amplifier; and
   a first metal-oxide-semiconductor transistor having a first terminal for receiving a first voltage, a second terminal coupled to an output terminal of the operational amplifier, and a third terminal coupled to the second input terminal of the operational amplifier;
   wherein the first metal-oxide-semiconductor transistor and the second resistor generates the sensing current according to a voltage drop between the first terminal of the second resistor and the second terminal of the second resistor.

4. The controller of claim 1, wherein the voltage generation module comprises:
   a charging time generation unit for determining a charging time according to the sensing current; and
   a set voltage generation unit for generating the set voltage according to the charging time.

5. The controller of claim 4, wherein
   the charging time generation unit comprises:
   a first current source having a first terminal for receiving a second voltage, and a second terminal, wherein the first current source is used for mirroring and providing the sensing current;

a second metal-oxide-semiconductor transistor having a first terminal coupled to the second terminal of the first current source, a second terminal, and a third terminal coupled to ground;
a first capacitor having a first terminal coupled to the second terminal of the first current source, and a second terminal coupled to the ground; and a first comparator having a first input terminal coupled to the second terminal of the first current source, a second input terminal for receiving a reference voltage, and an output terminal coupled to the second terminal of the second metal-oxide-semiconductor transistor, wherein the sensing current, the first capacitor, and the reference voltage are used for determining the charging time; and the set voltage generation unit comprises:
a second current source having a first terminal for receiving a third voltage, and a second terminal, wherein the second current source is used for providing a reference current;
an inverter having a first terminal coupled to the output terminal of the first comparator, and a second terminal;
a third metal-oxide-semiconductor transistor having a first terminal coupled to the second terminal of the second current source, a second terminal coupled to the second terminal of the inverter, and a third terminal;
a second capacitor having a first terminal coupled to the third terminal of the third metal-oxide-semiconductor transistor, and a second terminal coupled to the ground;
a fourth metal-oxide-semiconductor transistor having a first terminal coupled to the first terminal of the second capacitor, a second terminal coupled to the second terminal of the inverter, and a third terminal;
a third capacitor having a first terminal coupled to the third terminal of the fourth metal-oxide-semiconductor transistor, and a second terminal coupled to the ground for outputting the set voltage; and
a fifth metal-oxide-semiconductor transistor having a first terminal coupled to the first terminal of the second capacitor, a second terminal coupled to the output terminal of the first comparator, and a third terminal coupled to the ground;
wherein the reference current, the second capacitor, the third capacitor, and the charging time are used for determining the set voltage.

6. The controller of claim 5, wherein when a voltage of the first terminal of the first capacitor is less than or equal to the reference voltage, the second metal-oxide-semiconductor transistor is turned off, the fifth metal-oxide-semiconductor transistor is turned off, the third metal-oxide-semiconductor transistor is turned on, and the fourth metal-oxide-semiconductor transistor is turned on.

7. The controller of claim 6, wherein when the second metal-oxide-semiconductor transistor is turned off, the fifth metal-oxide-semiconductor transistor is turned off, the third metal-oxide-semiconductor transistor is turned on, and the fourth metal-oxide-semiconductor transistor is turned on, the first current source charges the first capacitor, and the second current source charges the second capacitor and the third capacitor.

8. The controller of claim 5, wherein when a voltage of the first terminal of the first capacitor is greater than the reference voltage, the second metal-oxide-semiconductor transistor is turned on, the fifth metal-oxide-semiconductor transistor is turned on, the third metal-oxide-semiconductor transistor is turned off, and the fourth metal-oxide-semiconductor transistor is turned off.

9. The controller of claim 5, wherein the voltage regulation module comprises:
a second comparator having a first input terminal coupled to the third terminal of the fourth metal-oxide-semiconductor transistor, a second input terminal for receiving the sensing voltage, and an output terminal for outputting the regulation voltage to the feedback circuit, wherein the feedback circuit is used for generating a feedback current to a power switch controller of the primary side of the power converter according to the regulation voltage.

10. The controller of claim 9, wherein the power switch controller controls a duty cycle of a power switch of the primary side of the power converter to regulate the output voltage according to the feedback current.

11. A method for controlling a power converter to output constant power, the method comprising:
generating a sensing current according to an output current flowing through a secondary side of the power converter;
generating a set voltage corresponding to a reciprocal of the sensing current according to the sensing current;
generating a regulation voltage to a feedback circuit of the secondary side of the power converter according to the set voltage and a sensing voltage corresponding to an output voltage of the secondary side of the power converter; and
regulating the output voltage according to the regulation voltage;
wherein a product of the output voltage and the output current is a constant value.

12. The method of claim 11, wherein the sensing current is proportional to the output current.

13. The method of claim 11, wherein generating the set voltage corresponding to the reciprocal of the sensing current according to the sensing current comprises:
determining a charging time according to the sensing current; and
generating the set voltage according to the charging time.

14. The method of claim 11, wherein regulating the output voltage according to the regulation voltage comprises:
generating a feedback current to a power switch controller of a primary side of the power converter according to the regulation voltage; and
controlling a duty cycle of a power switch of the primary side of the power converter to regulate the output voltage according to the feedback current.

* * * * *